United States Patent
Shekleton

[11] Patent Number: 5,174,108
[45] Date of Patent: Dec. 29, 1992

[54] TURBINE ENGINE COMBUSTOR WITHOUT AIR FILM COOLING

[75] Inventor: Jack R. Shekleton, San Diego, Calif.

[73] Assignee: Sundstrand Corporation, Rockford, Ill.

[21] Appl. No.: 764,052

[22] Filed: Sep. 23, 1991

Related U.S. Application Data

[63] Continuation of Ser. No. 448,254, Dec. 11, 1989, abandoned.

[51] Int. Cl.[5] .............................................. F02C 3/05
[52] U.S. Cl. ..................................... 60/39.36; 60/760
[58] Field of Search .................. 60/39.37, 752, 753, 60/760, 39.36

[56] References Cited

U.S. PATENT DOCUMENTS

| | | |
|---|---|---|
| 2,627,719 | 2/1953 | Stalker . |
| 2,855,754 | 10/1958 | Giannotti . |
| 3,099,134 | 7/1963 | Calder et al. ........................ 60/752 |
| 3,613,360 | 10/1971 | Howes ............................... 60/39.36 |
| 3,968,644 | 7/1976 | Fehler ................................. 60/746 |
| 4,018,043 | 4/1977 | Clemmens ........................ 60/39.36 |
| 4,038,815 | 8/1977 | Heitmann et al. . |
| 4,084,371 | 4/1978 | Howald . |
| 4,151,709 | 5/1979 | Melconian et al. . |
| 4,339,924 | 7/1982 | White et al. ......................... 60/746 |
| 4,549,402 | 10/1985 | Saintsbury et al. . |
| 4,651,534 | 3/1987 | Stroem ................................ 60/757 |

Primary Examiner—Richard A. Bertsch
Assistant Examiner—Timothy S. Thorpe
Attorney, Agent, or Firm—Wood, Phillips, VanSanten, Hoffman & Ertel

[57] ABSTRACT

Difficulties in cooling the shrouds (32, 34) and the nozzle (38) of an air breathing gas turbine are minimized or eliminated through the use of a generally toroidal, annular combustor (44) having an outlet (48) and combustion air inlets (90A, 90B) and otherwise being imperforate or free of any means for the admission of cooling air to the interior of the combustor (44).

5 Claims, 2 Drawing Sheets

TURBINE ENGINE COMBUSTOR WITHOUT AIR FILM COOLING

This application is a continuation of application Ser. No. 07/448,254, filed Dec. 11, 1989 now abandoned.

FIELD OF THE INVENTION

This invention relates to an air breathing turbine engine, and more particularly, to an improved combustor usable in the same.

BACKGROUND OF THE INVENTION

Air breathing, gas turbine engines conventionally employ a rotary compressor to provide compressed air that is ultimately used for two primary purposes. A first purpose is to serve as combustion air, that is, to provide the source of oxygen necessary to support oxidation of the fuel. A second purpose is to provide cooling of various engine components.

In a conventional radial turbine engine, for example, components requiring cooling by compressed air from the compressor include the combustor which typically is an annular combustor, the front turbine shroud, the rear turbine shroud and an annular nozzle and the vanes thereof. Usually, but not always, no separate provision is made for cooling the turbine wheel itself since much of the air used for cooling other components enters the stream of the gases of combustion to dilute the same such that the temperature of the gas impinging upon the turbine wheel is sufficiently low that the turbine wheel may readily be subjected to it without deleterious effects.

In the usual case, in order to cool the combustor, some means are typically provided in the form of openings in the combustor wall at various locations along with so-called cooling strips. As the combustor is typically disposed in a plenum connected to the outlet for the compressor, compressed air will enter the interior of the combustor through such apertures and be directed by the cooling strips along the interior of the combustor wall in a film-like flow regimen. The attachment of this flowing air film to the wall provides a buffer-like layer of air between the hot gases of combustion within the combustor and the combustor wall to prevent direct heat transfer between the same. Furthermore, a measure of convective cooling is provided as heat is transferred from the wall to the flowing air film.

This air ultimately serves as dilution air by mixing with the gases of combustion prior to the application of the same to the nozzle and ultimately to the turbine wheel. However, because it is mixed with the gases of combustion at this point in time, it cannot serve to provide a cooling function for the nozzle and/or the turbine wheel or, for that matter, turbine shrouds or the like. And because the output of any given compressor is limited, the use of air for cooling the interior surface of a combustor necessarily detracts from the amount of air available for directly cooling the turbine nozzle and/or shroud and/or turbine wheel.

This in turn limits the power density achievable within the combustor to a lower level than would be the case if more air could be utilized to cool the vanes and shrouds in order to assure that the same are not subjected to unduly high temperatures that would either shorten the life of the engine or require resort to exotic material of high cost for use in fabricating these components.

The present invention is directed to overcome one or more of the above problems.

SUMMARY OF THE INVENTION

It is the principal object of the invention to provide a new and improved, air breathing turbine engine. More specifically, it is an object of the invention to provide such an engine wherein the combustor is free of any means for providing cooling air on the interior thereof so that air heretofore used for such purpose may be advantageously employed to directly cool other engine components such as engine shrouds, the nozzle and the vanes thereof, or the like.

An exemplary embodiment of the invention achieves the foregoing object in a gas turbine engine including a rotary compressor along with a turbine wheel coupled to the compressor. An annular nozzle is provided for directing gases of combustion at the turbine wheel to drive the same and an annular plenum is disposed in fluid communication with the compressor to receive compressed air therefrom. A toroidal combustor is disposed within the plenum and has an annular outlet connected to the nozzle. The combustor further has a combustion air inlet means connected to the plenum for allowing air necessary to support combustion with fuel to enter the combustor and is otherwise devoid of any air inlets for admitting cooling air into the interior of the combustor.

In a preferred embodiment, the air inlet means comprise tubular elements extending into the combustor from the plenum and which are oriented generally tangential to the interior of the combustor.

In a preferred embodiment, the plenum extends substantially completely around the exterior of the combustor and includes an annular discharge opening directed into the nozzle adjacent the outlet so that the sole means of cooling the combustor is the flow of compressed air in the plenum to the discharge opening and about the exterior of the combustor.

In a highly preferred embodiment, in order to enhance the cooling effect of such air flow, trip strips are located on the exterior of the combustor for inducing turbulence in the compressed air flowing to the discharge opening to thereby promote the transfer of heat from the combustor to the compressed air.

In a highly preferred embodiment, there are two rows of the tubes and fuel is injected into the combustor through the tubes in the row that is most remote from the outlet.

The invention contemplates various means of directing the air from the compressor that otherwise would be utilized to cool the interior wall of the combustor against engine components such as the front shroud, rear shroud or turbine nozzle to directly cool the same.

Other objects and advantages will become apparent from the following specification taken in connection with the accompanying drawings.

DESCRIPTION OF THE PREFERRED EMBODIMENT

Figure 1:
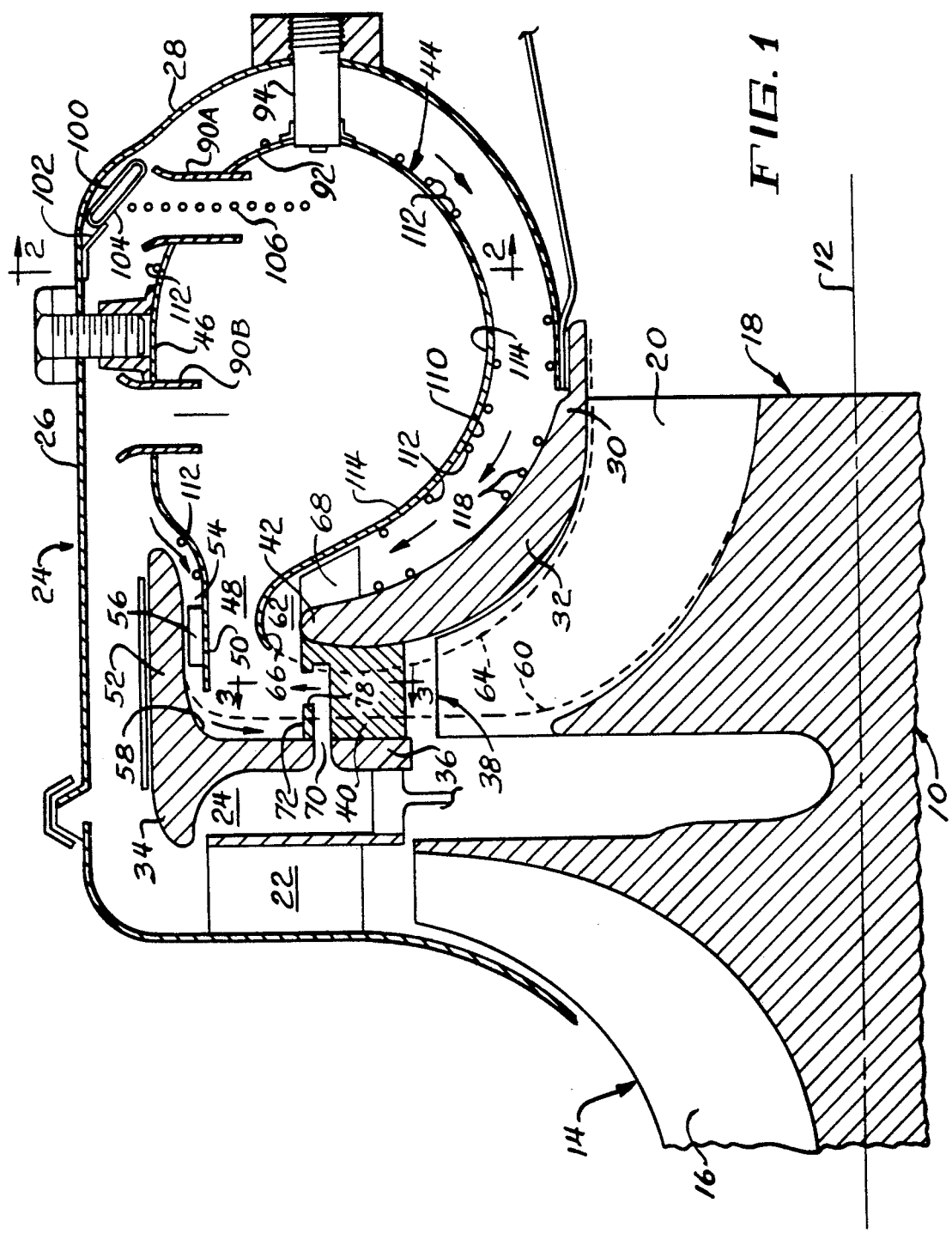
FIG. 1 is a fragmentary, sectional view of a gas turbine engine made according to the invention.

An exemplary embodiment of a gas turbine engine made according to the invention is illustrated in the drawings and with reference to FIG. 1 is seen to include a rotor, generally designated 10, mounted by suitable means (not shown) for rotation about an axis 12. The rotor 10 includes a compressor side, generally designated 14, including a plurality of blades 16 to thereby define a rotary compressor. On the opposite side, the rotor 10 includes a turbine wheel side, generally designated 18, which in turn is provided with turbine blades 20. Because both the compressor 14 and turbine wheel 18 are on a common rotor 10, it follows that the turbine wheel 18 is coupled to the compressor 14 to drive the same. At the same time, it is to be understood that the two components need not be constructed as illustrated in FIG. 1 and could even be rotatable about separate axes so long as they are coupled.

The compressor blades 16 discharge compressed air through a vaned diffuser 22 of conventional construction. From the diffuser 22, the compressed air enters a plenum, generally designated 24, which is annular about the axis 12. The plenum 24 includes a radially outer wall 26 connected to a curved, generally radially extending wall 28, which in turn terminates at the radially inner end 30 of a rear turbine shroud 32. As is well known, the rear turbine shroud 32 is closely adjacent the edges of the turbine wheel blades 20 to confine gases of combustion there against.

The apparatus also includes a front turbine shroud 34 and near its radially inner end 36, a nozzle, generally designated 38, composed of a plurality of vanes 40 is provided. More particularly, the vanes 40 extend between the radially inner end 36 of the front turbine shroud 34 and the radially outer end 42 of the rear turbine shroud 32.

Within the plenum 24 and spaced therefrom is a substantially toroidal combustor, generally designated 44. The combustor 44 is substantially toroidal in the strict geometric sense of the word in that its configuration is generally defined by that of a circle rotated about the axis 12 in spaced relation thereto. The combustor 44 is not strictly toroidal in that its radially outer surface 46 may deviate in curvature somewhat from that of a circle and in that one side is interrupted as at 48 to provide an outlet for gases of combustion which is in fluid communication with the nozzle 38. More particularly, the combustor 44 includes a somewhat cylindrical wall section 50 just radially inward of an axially extending section 52 of the front turbine shroud 34. A cooling air passage 54 is thus defined and the same may include swirl vanes 56 to direct the cooling air flowing through the passage 54 in a swirling direction for purposes to be seen. The cooling air going through the passage 54 impinges upon a relatively small radius 58 between the axially extending part 54 of the front shroud 34 and the radially directed part terminating in the inner end 36 to closely hug the same and provide good convective cooling. The swirling motion imparted to this air stream by the swirler vanes 56 imparts sufficient velocity to the stream as a result of centrifugal force that the same tends to follow a general flow path indicated by the dotted line 60 to provide good cooling of the front shroud 34 as mentioned previously as well as the sides of the vanes 40 adjacent thereto. In addition, the juncture of the turbine wheel blades 20 with the rotor 10 is likewise cooled by this stream.

It will be observed from FIG. 1 that the combustor 44 is spaced from each of the corresponding walls of the plenum 24 so that compressed air exiting the diffuser 22 may flow entirely about the combustor 42 to the outlet area 48. At this point, there is a separate annular outlet area 62 between the combustor 44 and the radially outer end 42 of the rear turbine shroud 32. The air passing about the combustor 44 within the plenum 24 may exit through this opening 62 which is closely adjacent the juncture of the vanes 40 with the rear turbine shroud 32 and flow generally in a path shown by a dotted line 64 to provide direct cooling of the sides of the vanes 40 connected to the rear turbine shroud 32 as well as the tips of the blades 20. In this respect, the combustor 44 may be provided with an inwardly directed lip 66 to redirect cooling air flow leaving the discharge opening 62 in the desired direction.

Another set of swirler vanes 68 may be located between the combustor 44 and the rear shroud 32 adjacent the radially outer end 42 of the latter to provide a desired swirl to air exiting the outlet 62.

Figure 3:
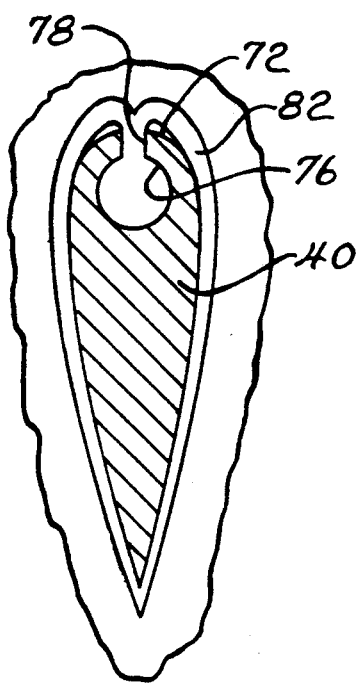
FIG. 3 is an enlarged, fragmentary sectional view taken approximately along the line 3—3 in FIG. 1.

To provide cooling of the center part of the vanes 40, the front shroud 34 includes a series of openings 70, one for each of the vanes 40, aligned with the leading edge 72 thereof and in fluid communication via a passage 74 with the outlet side of the diffuser 22. As seen in FIGS. 1 and 3, each vane 40, near its leading edge 72, include an axially extending bore 76 or the like which terminates in a single opening 78 in the leading edge 72 facing generally in the direction of the outlet 48 from the combustor 44. The opening 78 is located generally midway between the shrouds 32 and 34 and as a consequence of this construction, compressed air from the outlet side of the diffuser 22 emanates through the opening 78 and may flow in streams designated 82 and 84 in FIG. 3 along the corresponding vane 40 to provide cooling of the middle section thereof.

Figure 2:
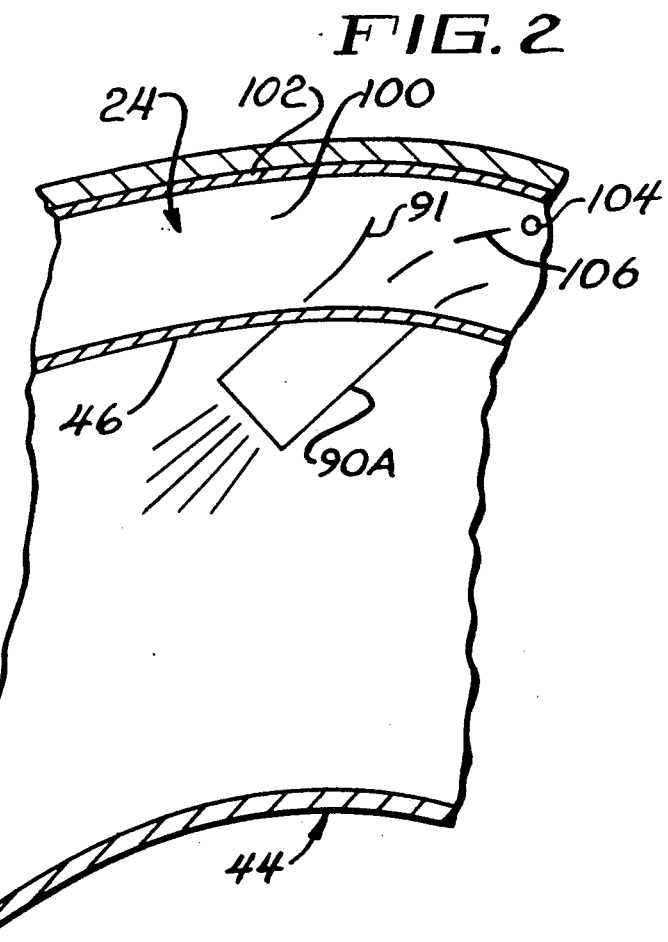
FIG. 2 is a somewhat enlarged, fragmentary sectional view taken approximately along the line 2—2 in FIG. 1.

The combustor 44 is characterized as being imperforate except for the outlet 48 and air inlet means which are utilized solely to provide air sufficient to support combustion and not for cooling purposes. As seen in FIGS. 2 and 3, tubes 90 having flared radially outer ends 91 are utilized for the purpose. The tubes 90 are disposed in the radially outer wall section 46 of the combustor 44 with their flared ends 91 located within the plenum 24 to receive compressed air from the outlet side of the diffuser 22. The tubes 90, as best seen in FIG. 2, are oriented tangentially with respect to the interior of the combustor 44 so as to provide circumferential swirl of injected air therein.

In a preferred embodiment, one such tube, shown at 90A in FIG. 1 is closely adjacent a generally radially extending quadrant 92 of the combustor while another is shown at 90B which is located roughly midway between the outlet 48 and the tube 90A. In fact, there will be a plurality of each of the tubes 90A and 90B at equally angularly spaced locations about the combustor 44.

The quadrant 92 may also mount an igniter 94.

To provide fuel to the interior of the combustor 44 for combustion purposes, a flattened tube 100 is disposed within the plenum 24 by a mounting bracket 102. At locations upstream of the flared ends 91 of each of the tubes 90A, one or more outlet openings 104 are located in the radially inner side of the flatten tube 100 so that fuel exiting the openings 104 will flow into corresponding and aligned one of the tubes 90A as shown by a stream 106.

Desirably, the exterior surface 110 of the combustor 44, at desired locations, is provided with so-called trip strips 112. The trip strips are relatively shallow strips suitably bonded to the exterior of the combustor 44 as, for example, by brazing and extend at an angle, generally right angles, to the direction of air flow in the plenum about the exterior of the combustor 44. As such, the trip strips 112 induce turbulence in the flowing air in the immediate vicinity of the exterior surface 110 to increase the Reynolds Number of the flowing air and that in turn increases the rate of heat transfer. As a consequence of this construction, the combustor 44 is adequately cooled solely by air flowing along the exterior surface 110 thereof. That is to say, the combustor 44 is imperforate save for the outlet 48 and the combustion air inlets 90A and 90B. No provision whatsoever is made for the admission of air to the interior surface 114 of the combustor, for film cooling, or, for that matter, any interior cooling. As a consequence of this construction, more of the output of the compressor 14 is available to pass through passage 54 for front shroud and vane cooling purposes, to pass through the plenum and out of the discharge opening 62 to cool the rear shroud 32 on both sides thereof as well as parts of the vane and to pass through the openings 78 in the vanes 40 to cool the vanes as well as to provide some cooling of the turbine wheel 18 at the tips of the blades 20 and the juncture of the blades 20 with the rotor 10.

In some instances, it may be desirable to provide trip strips 118 on the surface of the rear shroud 32 facing the combustor 44 to achieve improved cooling at this location as well.

Illustratively, the various passages may be configured to provide the following relative flows. Twelve percent of the compressor output may be directed to the interior of the combustor 44 through the tubes 90A along with streams of fuel 106 while additional combustion air to the extent of approximately eighteen percent of the compressor output may enter the combustor 44 through the tubes 90B.

A full forty percent of the compressor output may be flowed about the combustor 44 within the plenum 24 while ten percent of the compressor output may be injected into the hot gas stream via the opening 78 in the leading edges 72 of the vanes 40. The remaining twenty percent may enter the system through the passage 54.

Quite unexpectedly, excellent flame characteristics are achieved in this engine. A blue flame when operating on JP-10 fuel may be obtained and this flame frequently will appear as burning on the radially outer part 46 of the interior surface 114 of the combustor 44 since it is not disturbed by any cooling air flow in the absence of any cooling air inlets. This location occurs because of the centrifugal forces acting upon the fuel due to the orientation of tubes 90A. Blue flame does not generate much radiative heat which thus minimizes the cooling requirements for the combustor 44. And since no air film cooling on the interior of the combustor 44 is employed, more of the output of the compressor 14 is available to cool the nozzle and shroud components.

Because the blue flame is allowed to exist as though fuel were burning on the radially outer wall of the combustor 44, the injection system may be made relatively inexpensively because a high degree of fuel atomization is not required.

The use of a toroidal shape for the combustor results in a lesser pressure loss on cooling air as it passes through the plenum 24 about the combustor 44 and provides a better volume to surface ratio to enhance combustion. In addition, it minimizes the surface area of the combustor to thereby reduce the surface area requiring cooling. Further, the elimination of the addition of cooling or dilution air to the interior of the combustor 44 permits better control of sizing of the combustion air inlets 90A and 90B to provide, with a greater degree of precision, desired quantities of combustion air.

I claim:
1. A gas turbine engine comprising:
   a rotary compressor;
   a turbine wheel coupled to said rotary compressor;
   an annular nozzle for directing gases of combustion at said turbine wheel to drive the same;
   an annular plenum in fluid communication with said compressor to receive compressed air therefrom; and
   a toroidal combustor within said plenum and having an annular outlet connected to said nozzle, said combustor further having an air inlet means connected to said plenum for allowing entry of air necessary to support combustion and defined by tubular elements extending into said combustor from said plenum and generally tangential to the interior of said combustor and being devoid of any air inlets for admitting cooling air into the interior of said combustor, the toroidal combustor having a configuration generally defined by a circle rotated about an axis in spaced relation thereto;
   said plenum extending substantially completely around the exterior of said combustor and including an annular discharge opening into said nozzle adjacent said outlet so that the sole means of cooling said combustor is the flow of compressed air in said plenum to said discharge opening about the exterior of said combustor.

2. The gas turbine engine of claim 1 further including trip strips on said exterior for inducing turbulence in the compressed air flowing to said discharge opening to promote the transfer of heat from said combustor to said compressed air.

3. A gas turbine engine comprising;
   a rotary compressor;
   a turbine wheel coupled to said rotary compressor;
   an annular nozzle for directing gases of combustion at said turbine wheel to drive the same;
   an annular plenum in fluid communication with said compressor to receive compressed air therefrom; and
   a toroidal combustor within said plenum and having an annular outlet connected to said nozzle, said combustor further having an air inlet consisting of a plurality of tubes extending from said plenum at angularly spaced locations into the interior of said combustor in a generally tangential direction, there being two rows of said tubes and fuel is injected into said combustor through the tubes in the row most remote from said outlet, the toroidal combustor having a configuration generally defined by a circle rotated about an axis in spaced relation thereto.

4. A gas turbine engine comprising;
   a rotary compressor;
   a turbine wheel coupled to said rotary compressor;

an annular nozzle for directing gases of combustion at said turbine wheel to drive the same;

an annular plenum in fluid communication with said compressor to receive compressed air therefrom; and a toroidal combustor within said plenum and having an annular outlet connected to said nozzle, said combustor further having an inlet consisting of a plurality of tubes extending from said plenum at angularly spaced locations into the interior of said combustor in a generally tangential direction, being toroidal combustor having a configuration generally defined by a circle rotated about an axis in spaced relation thereto;

said plenum extending substantially completely around the exterior of said combustor and including an annular discharge opening into said nozzle adjacent said outlet so that the sole means of cooling said combustor is the flow of compressed air in said plenum to said discharge opening about the exterior of said combustor, and trip strips on said exterior for inducing turbulence in the compressed air flowing to said discharge opening.

5. A gas turbine engine comprising:

a rotary compressor;

a turbine wheel coupled to said rotary compressor to drive the same;

an annular nozzle about said turbine wheel for directing gases of combustion at said turbine wheel to drive the same;

a toroidal combustor having an annular outlet connected to said nozzle and having a combustion air inlet means for allowing substantially only air necessary to support combustion with fuel to enter said combustor comprising a plurality of tubes extending into said combustor in a direction generally tangential to the interior of the combustor with the combustor otherwise having an imperforate wall to thereby be devoid of any air inlets for admitting cooling air into the interior of the combustor;

trip strips on the exterior of said combustor; and an annular plenum in fluid communication with said compressor to receive compressed air therefrom and extending substantially completely around the exterior of said combustor to an annular discharge opening into said nozzle adjacent said combustor outlet to establish a flow path for cooling air substantially completely around the exterior of the combustor so that the sole means of cooling said combustor is the flow of compressed air in said plenum to said discharge opening about the exterior of said combustor with said trip strips inducing turbulence in the flow of such compressed air to thereby increase the rate of heat transfer between said combustor and said compressed air.

* * * * *